United States Patent
Song et al.

(10) Patent No.: US 8,810,955 B1
(45) Date of Patent: Aug. 19, 2014

(54) SYSTEM AND METHOD FOR MONITORING FLY HEIGHT OF MULTIPLE READ HEADS OF A DATA STORAGE DEVICE

(71) Applicant: LSI Corporation, San Jose, CA (US)

(72) Inventors: Xiufeng Song, San Jose, CA (US); George Mathew, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/179,923

(22) Filed: Feb. 13, 2014

Related U.S. Application Data (60) Provisional application No. 61/935,122, filed on Feb. 3, 2014.

(51) Int. Cl.
*G11B 21/02* (2006.01)

(52) U.S. Cl.
USPC ............................................. 360/75; 360/31

(58) Field of Classification Search
CPC .......... G11B 5/58; G11B 5/09; G11B 5/6011; G11B 5/6005; G11B 5/6029; G11B 21/21; G11B 21/02
USPC .................................. 360/31, 75, 53, 234, 55
See application file for complete search history.

(56) References Cited

U.S. PATENT DOCUMENTS

| | | | | |
|---|---|---|---|---|
| 6,930,844 | B2 * | 8/2005 | Yeh et al. | 360/31 |
| 8,619,383 | B1 * | 12/2013 | Jung et al. | 360/75 |
| 8,730,612 | B1 * | 5/2014 | Haralson | 360/75 |

FOREIGN PATENT DOCUMENTS

WO      WO9738324     10/1997

* cited by examiner

*Primary Examiner* — Ali Neyzari
(74) *Attorney, Agent, or Firm* — Suiter Swantz pc llo (57) ABSTRACT

The disclosure is directed to monitoring changes in fly height for a plurality of read heads. Readback signals based upon a first periodic data sequence and a second periodic data sequence are detected using at least a first read head and a second read head at a first point in time corresponding to a first fly height of each read head and at a second point in time corresponding to a second fly height each read head. The difference between the first fly height and the second fly height of the first read head and the difference between the first fly height and the second fly height of the second read head are determined by comparing the respectively detected readback signals. A summation of the difference values, each having been multiplied by a fusion coefficient, is then used to estimate a global change in fly height.

20 Claims, 5 Drawing Sheets

SYSTEM AND METHOD FOR MONITORING FLY HEIGHT OF MULTIPLE READ HEADS OF A DATA STORAGE DEVICE

PRIORITY

The present application claims priority under 35 U.S.C. §119(e) to U.S. Provisional Patent Application Ser. No. 61/935,122, entitled SYSTEM AND METHOD FOR MONITORING FLY HEIGHT OF MULTIPLE READ HEADS OF A DATA STORAGE DEVICE, By Xiufeng Song et al., filed Feb. 3, 2014, which is currently, or is an application of which currently co-pending application(s) are entitled to the benefit of the filing date. The above-referenced provisional patent application is hereby incorporated by reference in its entirety.

FIELD OF INVENTION

The disclosure relates to the field of data storage devices and more particularly to data storage devices having two or more read heads.

BACKGROUND

A spatial separation between a read head and a disk platter is often referred to as a "fly height" of the read head. Fly height affects various performance factors in data storage devices, such as hard disk drives. For example, affected performance factors can include, but are not limited to, signal-to-noise ratio (SNR) of readback signals, recording density, and data recovery. Some of these factors can be accounted for by monitoring or controlling fly height. However, it is extremely difficult to directly measure the fly height of a read head due to the closed nature of most data storage devices, rapid movement of the read head relative to the disk platter, and sensitivity to even very small obstructions. It becomes even more difficult to keep track of changes in fly height for data storage devices having a plurality of read heads, such as in two-dimensional magnetic recording (TDMR) hard disk drives.

SUMMARY

Embodiments of the disclosure include a system and a method for monitoring changes in fly height for a plurality of read heads of a data storage device. In an embodiment, a data storage system includes a data storage device having a disk platter storing a plurality of periodic data sequences and a plurality of read heads located proximate to the disk platter. The data storage system further includes at least one processor in communication with at least a first read head and a second read head included in the plurality of read heads. In an embodiment, the processor is configured to: receive a first set of readback signals based upon a first periodic data sequence and a second periodic data sequence being detected by the first read head and the second read head at a first point in time corresponding to a first fly height of the first read head and a first fly height of the second read head; receive a second set of readback signals based upon the first periodic data sequence and the second periodic data sequence being detected by the first read head and the second read head at a second point in time corresponding to a second fly height of the first read head and a second fly height of the second read head; determine a difference between the first fly height of the first read head and the second fly height of the first read head and a difference between the first fly height of the second read head and the second fly height of the second read head by comparing the first set of readback signals and the second set of readback signals; and estimate a change in fly height for the plurality of read heads by summing the difference values determined for at least the first and second read heads, where each of the difference values is multiplied by a fusion coefficient.

Although the foregoing general description is directed to a "first read head" and a "second read head," those skilled in the art will appreciate that, in accordance with various embodiments of the disclosure, any number of (two or more) read heads may be used to estimate a global change in fly height for the plurality of read heads. In some embodiments, the total number of read heads defining the plurality of read heads is utilized to estimate the change in fly height. In other embodiments, only a portion of the plurality of read heads is used to estimate the change in fly height. Additional embodiments are described in the following detailed description. Moreover, it is to be understood that both the foregoing general description and the following detailed description are not necessarily restrictive of the disclosure. The accompanying drawings, which are incorporated in and constitute a part of the specification, illustrate embodiments of the disclosure, wherein like numbers represent like characters.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Some data storage devices, such as two-dimensional magnetic recording (TDMR) hard disk drives, include a plurality of read and write heads. For example, TDMR hard disk drives include at least a first read/write head assembly and a second read/write head assembly configured to read or write data on a magnetic disk platter. Reading speeds, recording speeds, and recording density are improved by increasing the number of read/write heads. However, increasing the total number of heads adds complexity and makes it necessary to reliably monitor and control fly height associated with each of the heads. Fly height needs to be carefully maintained for each head because lower fly heights (i.e. smaller separations between the read heads and the disk platter) are needed for higher signal-to-noise ratio (SNR) of resulting readback signals, yet at the same time, collisions with very small obstructions, such as dust particles, on the surface of the disk platter can result in data corruption or degraded performance. Accordingly, it is advantageous to keep changes in fly height within a range based upon a threshold SNR (i.e. maximum distance away from the disk platter) and a minimum separation needed to avoid collisions.

FIGS. 1A through 3 illustrate embodiments of a system and method for monitoring changes in fly height for a plurality of read heads of a data storage device. As used herein, the term "read head" may include a READ head assembly or a READ/WRITE head assembly including both of a read head and write head. Looking now to FIG. 1A, an embodiment of a data storage system 100 is shown including a data storage device 106 having plurality of read heads 108, such as a first read head 108A and a second read head 108B, configured to detect data sequences stored on a disk platter 110, such as a magnetic disk platter. The system 100 further includes a computing system including at least one processor 102 configured to execute computer-readable program instructions from a non-transitory carrier medium 104. The processor 102 is communicatively coupled to the read heads 108 and configured to receive readback signals in response to the data sequences detected by the read heads 108 from the disk platter 110. In some embodiments, as shown in FIG. 1B, the processor 102 or a dedicated controller (e.g. microcontroller, FPGA, PIC, or ASIC) is located on or within a portion of the data storage device 106.

Figure 1A:
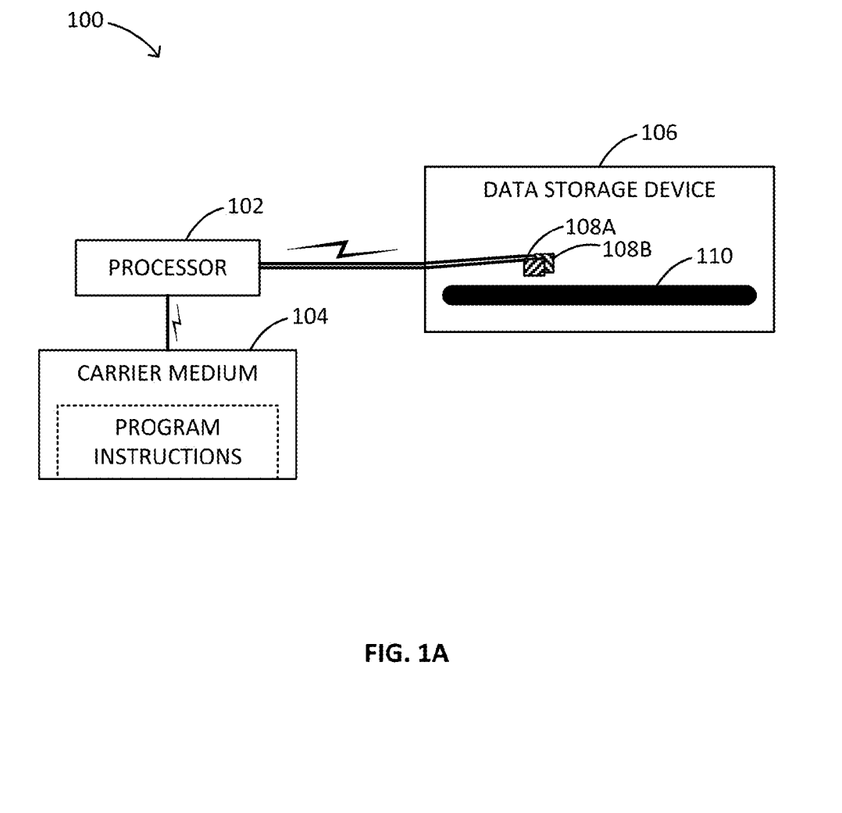
FIG. 1A is a block diagram illustrating a data storage system configured for monitoring changes in fly height for a plurality of read heads of a data storage device, in accordance with an embodiment of the disclosure.
Figure 1B:
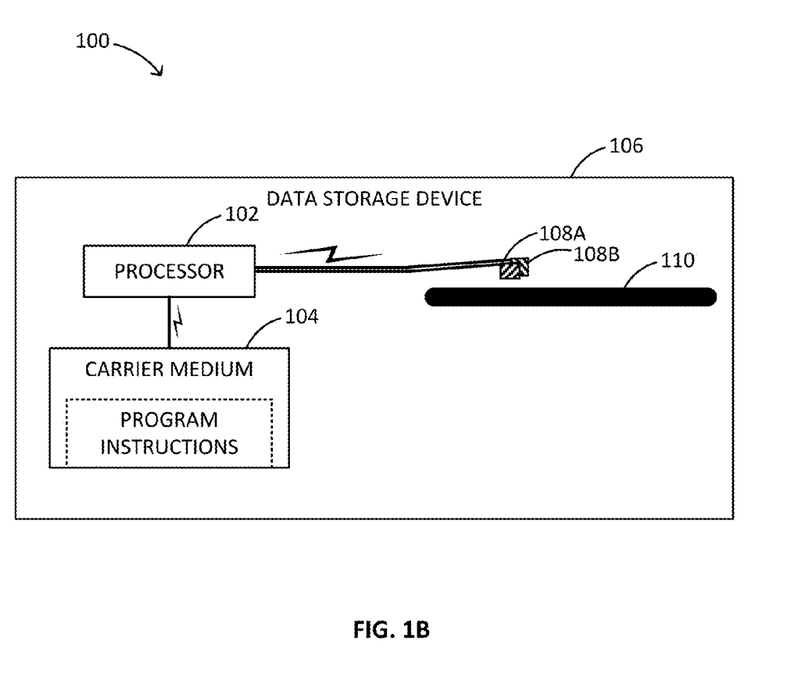
FIG. 1B is a block diagram illustrating a data storage system configured for monitoring changes in fly height for a plurality of read heads of a data storage device, wherein at least one processor for monitoring the changes in fly height is located on or within the data storage device, in accordance with an embodiment of the disclosure.
Figure 1C:
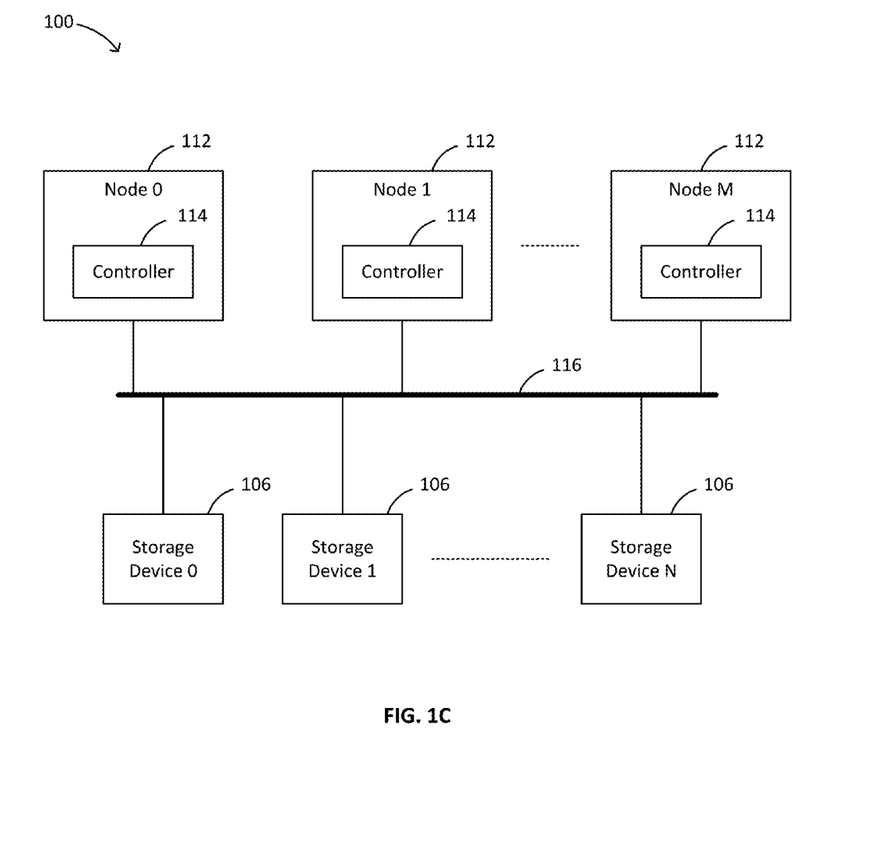
FIG. 1C is a block diagram illustrating a data storage system configured for monitoring changes in fly height for a plurality of read heads of at least one data storage device included in a plurality of data storage devices making up a redundant array of independent disks or devices (RAID) storage system, in accordance with an embodiment of the disclosure.

Some data storage systems include a plurality of storage devices, some or all of which may have a plurality of read heads. Redundant array of independent disk or device (RAID) configurations can include N storage devices including, but not limited to, hard-disk drives, solid-state drives, or a combination thereof, where N is any number greater than 1. In some embodiments, as shown in FIG. 1C, the data storage system 100 includes RAID configuration where the N devices making up a storage cluster include one or more data storage devices 106 having two or more read heads. For example, at least one of the N devices may include a data storage device 106 that is coupled with or includes a processor 102 for monitoring fly height of the two or more read heads (as shown in FIGS. 1A and 1B). According to the embodiments illustrated by FIG. 1C, the data storage system 100 further includes one or more nodes 112 or servers, each including a respective controller 114. The controller 114 in each of the one or more nodes 112 may include a RAID-on-Chip (ROC) controller, a processor, or any other controller configured to access some or all of the N devices via a network 116, such as one or more switches or expanders, directly or indirectly linking the controller 114 to the one or more storage devices 106.

Figure 2A:
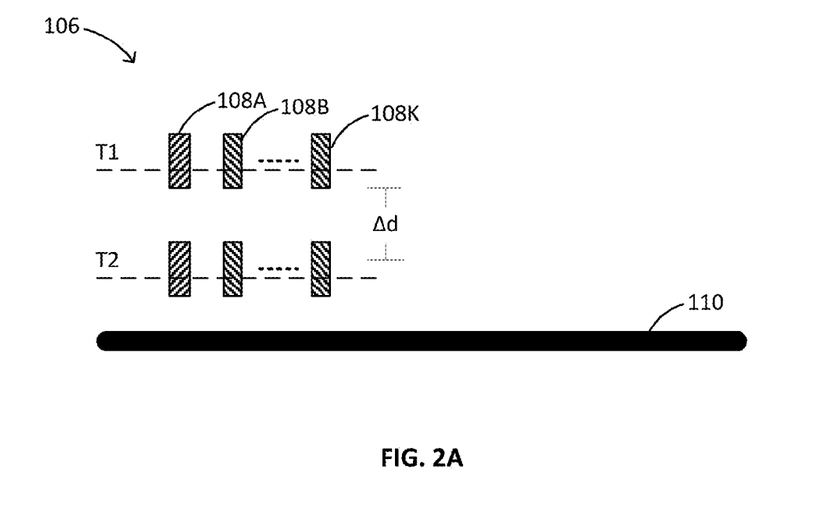
FIG. 2A is a conceptual illustration of two or more read heads moving relative to a disk platter, wherein each read head is located at a respective first fly height at a first time T1 and at a respective second fly height at a second time T2, in accordance with an embodiment of the disclosure.
Figure 2B:
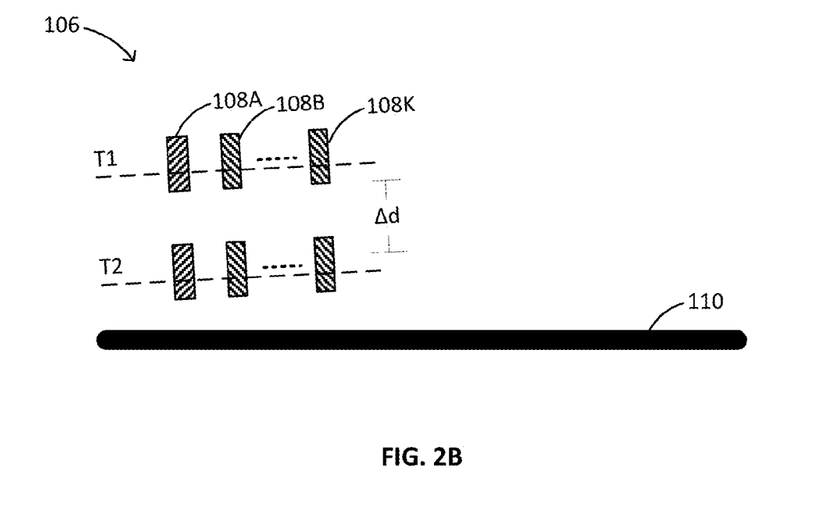
FIG. 2B is a conceptual illustration of two or more read heads moving relative to a disk platter, wherein each read head is located at a respective first fly height at a first time T1 and at a respective second fly height at a second time T2, in accordance with an embodiment of the disclosure.

FIGS. 2A and 2B illustrate two or more read heads 108 (e.g. read heads 108A, 108B, . . . 108K) moving relative to the disk platter 110. As shown in FIG. 2B, even if the read heads 108 have different respective fly heights at a first point in time (T1) and at a second point in time (T2), they all exhibit similar change in fly height (Δd) as a result of having substantially parallel movement. Some degree of non-parallel movement is possible but, in most cases, this will not introduce significant error. A change or difference in fly height from T1 to T2 determined for a single read head is indicative of the change in fly height for all of the read heads. In practice, however, each read head will exhibit some error due to SNR of its readback signals, slight differences in movement, and the like. To improve reliability of the estimated changes in fly height, two or more values (from different read heads) can be fused together to determine a global change in fly height for the read heads 108. Although many of the embodiments described herein include the use of a first read head 108A and a second read head 108B to determine a global change in fly height, it should be understood that any number of (two or more) read heads making up a portion or a total of the read heads 108 in a data storage device 106 can be used to determine the global change in fly height.

Figure 3:
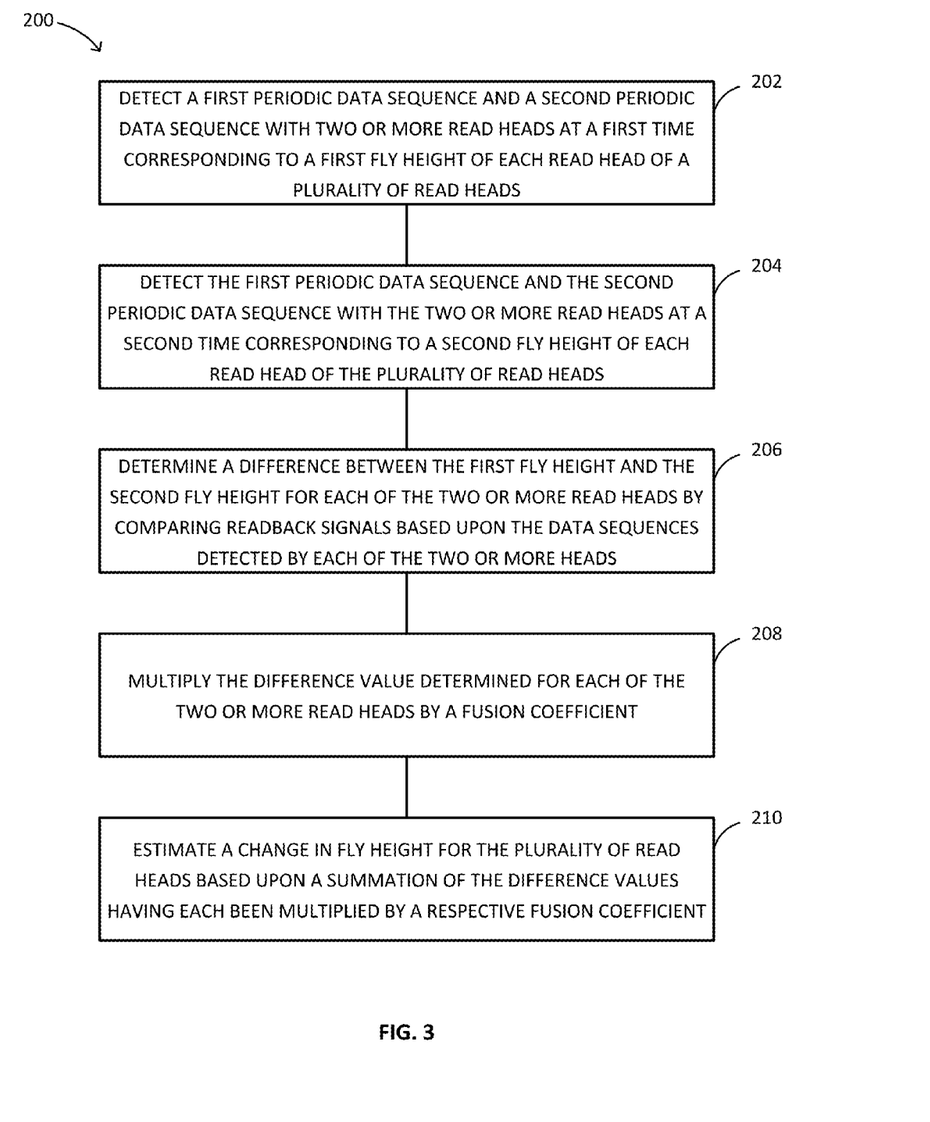
FIG. 3 is a flow diagram illustrating a method for monitoring changes in fly height for a plurality of read heads of a data storage device, in accordance with an embodiment of the disclosure.

In accordance with the foregoing concepts, FIG. 3 illustrates a method 200 of monitoring changes in fly height for two or more read heads 108 of a data storage device 106. In some embodiments, computer-readable program instructions implementing the steps of method 200 are executed by at least one processor 102 from a communicatively coupled carrier medium 104, as discussed in further detail below. Those skilled in the art will further appreciate that method 200 is not restricted to the embodiments of system 100 described herein and can be executed with any combination of systems and devices configured to carry out the following steps.

At step 202, a first set of readback signals is received by the processor 102 from at least a first read head 108A and a second read head 108B. In an embodiment, the first set of readback signals is based upon detecting a first periodic data sequence and a second periodic data sequence with the first read head 108A and the second read head 108B from the disk platter 110 at a first point in time (T1) corresponding to a first fly height of the first read head 108A and a first fly height of the second read head 108B. The first set of readback signals includes at least a first readback signal and a second readback signal received from the first read head 108A in response to detecting the first periodic data sequence and the second periodic data sequence, respectively, at T1. In some embodiments, the first set of readback signals further includes a at least a first readback signal and a second readback signal received from the second read head 108B in response to detecting the first periodic data sequence and the second periodic data sequence, respectively, at T1. In some embodiments, instead of being based on the same set of periodic data sequences, the first set of readback signals may include readback signals received from the first read 108A based upon detection of the first and second periodic data sequences and readback signals received from the second read head 108B based upon detection of a different set of data sequences, such as a third periodic data sequence and a fourth periodic data sequence. However, the periodic data sequences used to collect the first set of readback signals at T1 should match the periodic data sequences used to collect the second set of readback signals at step 204 (discussed below).

According to various embodiments, the first periodic data sequence has a first frequency or wave number (k1) that is different from the frequency or wave number (k2) of the second periodic data sequence. Similarly, in cases where different data sequences, such as the third and fourth data sequences, are detected by the second read head 108B, they should each have a different respective frequency or wave number (k). For example, the first head 108A may detect the first periodic data sequence and the second periodic data sequence with frequencies represented by $k_1$ and $k_2$, respectively, while the second read head 108B detects two periodic data sequences with frequencies represented by $k_3$ and $k_4$. To estimate the fly height it is necessary that $k_1 \neq k_2$ and $k_3 \neq k_4$. However, it is possible for $k_1=k_3$, $k_1=k_4$, $k_2=k_3$, or $k_2=k_4$. For example, if the first read head 108A and the second read head 108B read the same tracks at T1 and T2, then $k_1=k_3$ and $k_2=k_4$. However, if the first read head 108A and the second read head 108B read different tracks at T1 and T2, then $k_1 \neq k_3$ and $k_2 \neq k_4$. Further, it is possible for the first read head 108A and the second read head 108B to read the same tracks at T1 and different tracks at T2, or vice versa, which would result in $k_1=k_3$ and $k_2 \neq k_4$ or $k_1 \neq k_3$ and $k_2=k_4$, respectively.

The periodic data sequences may be stored on servo data (i.e. factory-written or read only) portions of the disk platter 110 or on user data (i.e. rewritable) portions of the disk platter 110, and in some embodiments, periodic data sequences from a combination of servo data and user data are detected by the read heads. For example, the first periodic data sequence may be stored in user data, while the second periodic data sequence is stored in servo data. Those skilled in the art will appreciate the ability to store and read data periodic sequences from servo data, user data, or a combination thereof and the ability to use any combination of periodic data sequences to determine change in fly height as each read head detects at least a first track having a first frequency and a second track having a second frequency that is different from the first frequency. Also, as indicated above, the number of periodic data sequences or the number of read heads 108 used to detect the periodic data sequences (i.e. when more than two read heads are available) may be increased to generate a greater number of measurement sets and improve accuracy of the estimated global change in fly height.

At step 204, a second set of readback signals is received by the processor 102 from at least the first read head 108A and the second read head 108B, where second set of readback signals is based upon detecting periodic data sequences matching those detected at step 202. In some embodiments, for example, the second set of readback signals is based upon detecting the first periodic data sequence and the second periodic data sequence again with the first read head 108A and the second read head 108B at a second point in time (T2) corresponding to a second fly height of the first read head 108A and a second fly height of the second read head 108B. In other embodiments, where different sets of data sequences are detected by the read heads 108, the first set of readback signals (detected at T1) and the second set of readback signals (detected at T2) may each be based upon detecting the first periodic data sequence and the second periodic data sequence with the first read head 108A and detecting the third periodic data sequence and the fourth periodic data sequence with the second read head 108B. Any combination of periodic data sequences can be used as long as each of the two or more read heads used to estimate the global change in fly height is configured to detect at least two periodic data sequences having different frequencies or wave numbers at T1 and further configured to detect the same data sequences again at T2.

For a given frequency, the strength of the readback signal received from a read head decays exponentially as fly height of the read head increases. The strength $V_i(k)$ of the signal from $i^{th}$ read head of a plurality of read heads can be approximated as follows:

$$V_i(k) = A_i(k)e^{-kd}$$

In the above equation, d represents the fly height, k represents the wave number ($k=2\pi/\lambda$), and $A_i(k)$ represents channel gain for the $i^{th}$ read head. With two readback signals corresponding to at least two different frequencies (i.e. two different periodic data sequences detected by the same read head), a logarithmic ratio $R_i(k_1,k_2)$ of the strength $V_i(k)$ at frequencies $k_1$ and $k_2$ can be expressed as follows:

$$R_i(k_1, k_2) = \log\left(\left|\frac{V_i(k_1)}{V_i(k_2)}\right|\right) = (k_2 - k_1)d + \log(B_i(k_1, k_2))$$

In the above equation, $B_i(k_1,k_2)$ represents the ratio of channel gains $A_i(k)$ for the $i^{th}$ read head at the first and second frequencies, $$B_i(k_1, k_2) = \left|\frac{A_i(k_1)}{A_i(k_2)}\right|.$$

At step 206, the first set of readback signals and the second set of readback signals corresponding to at least two periodic data sequences (e.g. the first and second periodic data sequences) detected at T1 and T2 are compared to determine a change in fly height from T1 to T2 for each of the two or more read heads being used to estimate the global change in fly height (e.g. the first read head 108A and the second read head 108B). In an embodiment, the difference between a first fly height ($d_1$) and a second fly height ($d_2$) of the $i^{th}$ read head of two or more read heads is determined by subtracting the logarithmic ratio $R_i^1(k_1,k_2)$ determined at T1 from the logarithmic ratio $R_i^2(k_1,k_2)$ determined at T2 to cancel out $B_i(k_1,k_2)$, as shown in the equations that follow:

$$R_i^1(k_1, k_2) = \log\left(\left|\frac{V_i(k_1)}{V_i(k_2)}\right|\right) = (k_2 - k_1)d_1 + \log(B_i(k_1, k_2))$$

$$R_i^2(k_1, k_2) = \log\left(\left|\frac{V_i(k_1)}{V_i(k_2)}\right|\right) = (k_2 - k_1)d_2 + \log(B_i(k_1, k_2))$$

$$\Delta R_i \triangleq R_i^2(k_1, k_2) - R_i^1(k_1, k_2) = (k_2 - k_1)(d_2 - d_1) = (k_2 - k_1)\Delta d$$

$$\Delta d_i = \frac{\Delta R_i}{k_2 - k_1}$$

Using the manipulations shown above, the processor 102 can compute the difference $\Delta d$ between the first fly height at T1 and the second fly height at T2 for the first read head 108A, the second read head 108B, and any additional read heads.

At step 208, each of the difference values are multiplied by a respective fusion coefficient. The fusion coefficient $w_i$ for the $i^{th}$ read head is always a number greater than or equal to zero and $\sum_{i=1}^{K} w_i = 1$, where K is the total number of read heads used to estimate the global change in fly height. According to various embodiments, K may be equal to all or a portion of the read heads 108 of the data storage device 106. In some embodiments, the respective fusion coefficient for each of the K read heads 108 is determined according to a ratio of readback signal SNR of the respective read head compared to a summation of the readback signal SNR values for the K read heads. The fusion coefficient $w_i$ for the $i^{th}$ read head may be determined as follows:

$$w_i = \frac{|SNR_i|^p}{\sum_{k=1}^{K} |SNR_k|^p}$$

In the above equation, p is a selected parameter that can be set by a user, according to a system specification, or based upon an algorithm. In instances where p=0, wi=1/K, and as such, the estimated global change in fly height will simply be an average of all the difference values determined for the K read heads. When p is very very large (i.e. effectively p=∞), the fusion coefficient for the read head having the largest SNR is substantially equal to 1 while the other fusion coefficients are substantially equal to 0. Accordingly, the estimated global change in fly height will be equal to the determined difference between the first fly height and the second fly height of the read head having readback signals with higher SNR than the other read heads. Those skilled in the art will appreciate that the selected parameter p can be any number and that it will be advantageous to set p to different values depending upon the number of read heads, known sources of error, known reliability of one or more read heads in comparison to others, or any other criteria.

At step 210, a global change in fly height $\Delta d_{Global}$ is determined for the plurality of read heads 108 based upon a summation of the difference values for the K read heads. In an embodiment, the global change in fly height is expressed as follows:

$$\Delta d_{Global} = \sum_{i=1}^{K} \Delta d_i w_i = \sum_{i=1}^{K} w_i \frac{\Delta R_i}{k_2 - k_1}$$

As can be seen above, the global change in fly height for a plurality of read heads 108 may be determined by a processor through fusion of the individual differences in fly height for K read heads, where K is greater than or equal to 2. In some embodiments, the estimated global change in fly height is further used to estimate a fly height of at least one read head based upon a known starting fly height or a nominal fly height. In some embodiments, the estimated change in fly height is further used to determine a control parameter for adjusting the position of at least one read head or a spin rate of the disk platter 110.

It should be recognized that the various functions, operations, or steps described throughout the present disclosure may be carried out by any combination of hardware, software, or firmware. In some embodiments, various steps or functions are carried out by one or more of the following: electronic circuits, logic gates, field programmable gate arrays, multiplexers, controllers, or computing systems. A computing system may include, but is not limited to, a personal computing system, mainframe computing system, workstation, image computer, parallel processor, or any other device known in the art. In general, the terms "controller" and "computing system" are broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A data storage system, comprising:
a disk platter storing a plurality of periodic data sequences;
a plurality of read heads located proximate to the disk platter; and
at least one processor in communication with at least a first read head and a second read head of the plurality of read heads, the at least one processor being configured to:
receive a first set of readback signals from the first read head and the second read head, the first set of readback signals being based upon a first periodic data sequence and a second periodic data sequence detected by the first read head and the second read head at a first fly height of the first read head and a first fly height of the second read head;
receive a second set of readback signals from the first read head and the second read head, the second set of readback signals being based upon the first periodic data sequence and the second periodic data sequence detected by the first read head and the second read head at a second fly height of the first read head and a second fly height of the second read head;
determine a difference between the first fly height of the first read head and the second fly height of the first read head and a difference between the first fly height of the second read head and the second fly height of the second read head by comparing the first set of readback signals and the second set of readback signals; and
estimate a change in fly height for the plurality of read heads at least partially based upon a summation of the difference between the first fly height of the first read head and the second fly height of the first read head and the difference between the first fly height of the second read head and the second fly height of the second read head, wherein each of the difference values is multiplied by a fusion coefficient.

2. The data storage system of claim 1, wherein the processor is further configured to:
determine a fly height of at least one of the plurality of read heads based upon the estimated change in fly height for the plurality of read heads.

3. The data storage system of claim 1, wherein each of the first periodic data sequence and the second periodic data sequence includes a portion of user data or a portion of servo data.

4. The data storage system of claim 1, wherein the first periodic data sequence has a frequency different from the second periodic data sequence.

5. The data storage system of claim 1, wherein the fusion coefficient is defined according to the following:

$$w_i \geq 0 \text{ and } \Sigma_{i=1}^{K} w_i = 1,$$

where $w_i$ represents the fusion coefficient, i represents a respective read head of the plurality of read heads, and K represents a total number of read heads being utilized to estimate the change in fly height for the plurality of read heads.

6. The data storage system of claim 5, wherein the fusion coefficient is further defined according to the following:

$$w_i = \frac{|SNR_i|^p}{\sum_{k=1}^{K} |SNR_k|^p},$$

where $SNR_i$ represents a signal to noise ratio of the respective read head, k represents a read head of the plurality of read heads, $SNR_k$ represents a signal to noise ratio of the read head referenced by k, and p represents a selected parameter.

7. The data storage system of claim 1, wherein the plurality of read heads comprises at least two read heads of a two-dimensional magnetic recording system.

8. The data storage system of claim 1, further comprising:
a plurality of data storage devices configured as a redundant array of independent disks (RAID) storage cluster, wherein at least one data storage device of the plurality of data storage devices includes the disk platter and the plurality of read heads located proximate to the disk platter.

9. A method of monitoring changes in fly height for a plurality of read heads located proximate to a disk platter of a data storage device, comprising:
receiving a first set of readback signals from at least a first read head and a second read head of the plurality of read heads, the first set of readback signals being based upon a first periodic data sequence and a second periodic data sequence detected from the disk platter by the first read head and the second read head at a first fly height of the first read head and a first fly height of the second read head;
receiving a second set of readback signals from the first read head and the second read head, the second set of readback signals being based upon the first periodic data sequence and the second periodic data sequence detected by the first read head and the second read head at a second fly height of the first read head and a second fly height of the second read head;
determining a difference between the first fly height of the first read head and the second fly height of the first read head and a difference between the first fly height of the second read head and the second fly height of the second read head by comparing the first set of readback signals and the second set of readback signals; and
estimating a change in fly height for the plurality of read heads at least partially based upon a summation of the difference between the first fly height of the first read head and the second fly height of the first read head and the difference between the first fly height of the second read head and the second fly height of the second read head, wherein each of the difference values is multiplied by a fusion coefficient.

10. The method of claim 9, further comprising:
determining a fly height of at least one of the plurality of read heads based upon the estimated change in fly height for the plurality of read heads.

11. The method of claim 9, further comprising:
detecting at least one of the first periodic data sequence and the second periodic data sequence from at least a portion of the disk platter reserved for servo data.

12. The method of claim 9, further comprising:
detecting at least one of the first periodic data sequence and the second periodic data sequence from at least a portion of the disk platter reserved for user data.

13. The method of claim 9, wherein the first periodic data sequence has a frequency different from the second periodic data sequence.

14. The method of claim 9, wherein the fusion coefficient is defined according to the following:

$$w_i \geq 0 \text{ and } \Sigma_{i=1}^{K} w_i = 1,$$

where $w_i$ represents the fusion coefficient, i represents a respective read head of the plurality of read heads, and K represents a total number of read heads being utilized to estimate the change in fly height for the plurality of read heads.

15. The method of claim 14, wherein the fusion coefficient is further defined according to the following:

$$w_i = \frac{|SNR_i|^p}{\sum_{k=1}^{K} |SNR_k|^p},$$

where $SNR_i$ represents a signal to noise ratio of the respective read head, k represents a read head of the plurality of read heads, $SNR_k$ represents a signal to noise ratio of the read head referenced by k, and p represents a selected parameter.

16. A non-transitory carrier medium bearing computer-readable instructions for monitoring changes in fly height for a plurality of read heads located proximate to a disk platter of a data storage device, the non-transitory carrier medium comprising computer-readable instructions for executing, via at least one processor, the steps of:
receiving a first set of readback signals from at least a first read head and a second read head of the plurality of read heads, the first set of readback signals being based upon a first periodic data sequence and a second periodic data sequence detected from the disk platter by the first read head and the second read head at a first fly height of the first read head and a first fly height of the second read head;
receiving a second set of readback signals from the first read head and the second read head, the second set of readback signals being based upon the first periodic data sequence and the second periodic data sequence detected by the first read head and the second read head at a second fly height of the first read head and a second fly height of the second read head;
determining a difference between the first fly height of the first read head and the second fly height of the first read head and a difference between the first fly height of the second read head and the second fly height of the second read head by comparing the first set of readback signals and the second set of readback signals; and estimating a change in fly height for the plurality of read heads at least partially based upon a summation of the difference between the first fly height of the first read head and the second fly height of the first read head and the difference between the first fly height of the second read head and the second fly height of the second read head, wherein each of the difference values is multiplied by a fusion coefficient.

17. The non-transitory carrier medium of claim 16, further comprising computer-readable instructions for:

determining a fly height of at least one of the plurality of read heads based upon the estimated change in fly height for the plurality of read heads.

18. The non-transitory carrier medium of claim 16, wherein the first periodic data sequence has a frequency different from the second periodic data sequence.

19. The non-transitory carrier medium of claim 16, wherein the fusion coefficient is defined according to the following:

$$w_i \geq 0 \text{ and } \Sigma_{i=1}^{K} w_i = 1,$$

where $w_i$ represents the fusion coefficient, i represents a respective read head of the plurality of read heads, and K represents a total number of read heads being utilized to estimate the change in fly height for the plurality of read heads.

20. The non-transitory carrier medium of claim 19, wherein the fusion coefficient is further defined according to the following:

$$w_i = \frac{|SNR_i|^p}{\sum_{k=1}^{K} |SNR_k|^p},$$

where $SNR_i$ represents a signal to noise ratio of the respective read head, k represents a read head of the plurality of read heads, $SNR_k$ represents a signal to noise ratio of the read head referenced by k, and p represents a selected parameter.

* * * * *